(12) United States Patent
Owens, Jr.

(10) Patent No.: US 11,475,799 B2
(45) Date of Patent: Oct. 18, 2022

(54) ANATOMIC CHIROPRACTIC TRAINING MANNEQUIN WITH NETWORK OF PRESSURE SENSORS

(71) Applicant: Edward F. Owens, Jr., Savannah, GA (US)

(72) Inventor: Edward F. Owens, Jr., Savannah, GA (US)

( * ) Notice: Subject to any disclaimer, the term of this patent is extended or adjusted under 35 U.S.C. 154(b) by 320 days.

(21) Appl. No.: 16/813,121

(22) Filed: Mar. 9, 2020

(65) Prior Publication Data

US 2021/0280086 A1 Sep. 9, 2021

(51) Int. Cl.
*G09B 23/32* (2006.01)

(52) U.S. Cl.
CPC .................... *G09B 23/32* (2013.01)

(58) Field of Classification Search
CPC ............................... G09B 23/30; G09B 23/32
USPC ......................................... 434/267, 274, 275
See application file for complete search history.

(56) References Cited

U.S. PATENT DOCUMENTS

| | | | | |
|---|---|---|---|---|
| 2,197,975 A * | 4/1940 | Fleet | ...................... | G09B 23/32 434/274 |
| 4,669,302 A * | 6/1987 | Wagner | ................... | G09B 23/32 73/818 |
| 4,773,865 A * | 9/1988 | Baldwin | ................ | G09B 23/30 434/274 |
| 5,441,413 A | 8/1995 | Kumar | | |
| 6,422,874 B1 * | 7/2002 | Green | .................... | G09B 23/32 434/274 |
| 7,942,676 B2 * | 5/2011 | Murdach | ................ | G09B 23/30 434/262 |

(Continued)

FOREIGN PATENT DOCUMENTS

| | | |
|---|---|---|
| CA | 2901952 C | 5/2017 |
| GB | 246327 A | 10/2010 |

OTHER PUBLICATIONS

Starmer DJ, Duquette SA, Stainsby BE, Giuliano AM. The examination of soft tissue compliance in the thoracic region for the development of a spinal manipulation training mannequin. J Can Chiropr Assoc. 2015;59(2):150-156.

(Continued)

*Primary Examiner* — Joseph B Baldori
(74) *Attorney, Agent, or Firm* — John G. Posa; Belzar P.C.

(57) ABSTRACT

Chiropractic training apparatus includes an anatomic mannequin incorporating a network of electronic sensors providing feedback to a user related to applied pressure. The mannequin may include a simulated human head and pelvic region with simulated articulating spinal vertebrae embedded in pliable silicone skin and gel materials. Electronic circuitry determines when pressure is applied to any of the plurality of pressure sensors during the palpation of the model, and output an electronic signal representative of the applied pressure. A mechanism may be provided to facilitate adjustment of relative joint stiffness. A computer display in communication with the model may show information indicative of vertebral level and/or color gradients associated with the pressure applied by a user. The physical model may only include portions of a simulated human spine (i.e., lumbar only). However, the model is preferably life-sized, and may be configured for prone positioning on a table or other work surface.

13 Claims, 9 Drawing Sheets

(56) References Cited

U.S. PATENT DOCUMENTS

| | | | |
|---|---|---|---|
| 8,323,029 B2 | 12/2012 | Toly | |
| 8,382,485 B2 * | 2/2013 | Bardsley | G09B 23/32 |
| | | | 434/262 |
| 8,439,688 B2 * | 5/2013 | Wilkins | G09B 23/30 |
| | | | 434/262 |
| 9,251,720 B2 * | 2/2016 | Ozawa | G09B 23/00 |
| 9,486,142 B2 * | 11/2016 | Hielscher | G06T 7/0012 |
| 9,666,102 B2 | 5/2017 | East et al. | |
| 10,467,927 B2 * | 11/2019 | Hastings | G09B 23/32 |
| 10,529,255 B2 * | 1/2020 | Wu | G09B 9/00 |
| 11,026,639 B2 * | 6/2021 | Leroy | A61B 5/7221 |
| 11,033,336 B2 * | 6/2021 | Bohl | G09B 23/30 |
| 2015/0170548 A1 * | 6/2015 | McClintock | G09B 23/32 |
| | | | 434/274 |
| 2017/0053564 A1 * | 2/2017 | Triano | G09B 5/02 |
| 2021/0150936 A1 * | 5/2021 | Gocmen | G09B 23/30 |

OTHER PUBLICATIONS

Owens EF Hosek RS, Russell BS. Mechanical properties of a thoracic spine mannequin with variable stiffness control. Journal Chiropractic Education 2020; (in press).

\* cited by examiner

ANATOMIC CHIROPRACTIC TRAINING MANNEQUIN WITH NETWORK OF PRESSURE SENSORS

FIELD OF THE INVENTION

This invention relates generally to chiropractic training and, in particular, to an anatomic mannequin including a network of electronic sensors providing feedback related to applied pressure.

BACKGROUND OF THE INVENTION

The hallmark of chiropractic care is the application of forces into the spine and pelvis, the High-Velocity Low-Amplitude (HVLA) manual method in particular, usually referred to as spinal adjustment or spinal manipulation. There is some controversy over the proper manner in which to apply the loads and many techniques exist.

Careful control of the magnitude and speed of thrusts are needed to ensure safety of the procedure for both the doctor and patient. A significant portion of the curricula in chiropractic schools is devoted to learning the diagnostic and psychomotor skills needed to deliver HVLA thrusts in a safe, effective manner.

Safety is a concern for patients as well as chiropractors themselves, who occasionally experience practice-related injuries. A number of studies have reported students being injured while playing the role of patient in chiropractic technique classes. Use of a mannequin in training of chiropractors and other manual therapists would allow for numerous thrusts by multiple novice student adjustors under controlled conditions without concern for injury by the recipient. Accordingly, there is an outstanding need for a high-fidelity mannequin for use in chiropractic technique training.

SUMMARY OF THE INVENTION

This invention resides in chiropractic training apparatus including physical model of at least a portion of a human torso and electronic circuitry operative to sense and communicate applied pressure to a user. In a preferred embodiment, the physical model is a mannequin comprising a life-sized simulacrum including a simulated human head an pelvic region with fully moveable and anatomically correct simulated spinal vertebrae embedded in pliable silicone skin and gel materials.

A plurality of pressure sensors are disposed at predetermined locations on the model, enabling a user to palpate the model through the simulated skin layer and locate internal structures. The electronic circuitry is operative to determine when pressure is applied to any of the plurality of pressure sensors during the palpation of the model, and output an electronic signal representative of the applied pressure.

In the preferred embodiments, the physical model incorporates a portion of a simulated human spinal column including a plurality of vertebral bodies with pressure sensors disposed on the vertebral bodies. The vertebral bodies may articulate through vertebral joints exhibiting a relative joint stiffness, and a mechanism may be provided to facilitate adjustment of the relative joint stiffness. Such a mechanism may include a plurality of tensionable and/or elastic elongated members such as cables or cords disposed alongside or through the vertebral bodies.

The plurality of vertebral bodies may include a plurality of lumbar vertebra having mammillary and spinous processes, with pressure sensors disposed on the mammillary and spinous processes. The plurality of vertebral bodies may include a plurality of cervical vertebra having articular pillars and spinous processes, with pressure sensors disposed on the articular pillars and spinous processes. The plurality of vertebral bodies may include a plurality of thoracic vertebra having spinous processes and transverse processes, with pressure sensors disposed on the spinous processes and transverse processes.

The electronic circuitry may include a microprocessor or microcontroller and multiplexer circuitry operative to sequentially scan the plurality of pressure sensors to determine when pressure is applied. The apparatus may further include a computer operative to receive the electronic signal output by the electronic circuitry and a display device in communication with the computer. In a preferred system-level configuration, the display may be operative to show an image representative of the physical model and information associated with pressure applied by a user to palpate the model. As an example, the display may to show information indicative of vertebral level and/or color gradients associated with the pressure applied by a user. The computer connected to the model may further including a memory for storing actions taken by one or more users, enabling the system to repeat or reproduce previous interactions with the model form educational or training purposes.

While in different embodiments the physical model may only include portions of a simulated human spine (i.e., lumbar only), in all embodiments, the model is preferably life-sized, and may be configured for prone positioning on a table or other work surface.

DETAILED DESCRIPTION OF THE PREFERRED EMBODIMENTS

This invention is directed to an anatomically correct mannequin, including a network of electronic sensors providing feedback related to applied pressure in conjunction with chiropractic training or other manual therapy disciplines. The system may be used in an educational setting to help teach students important diagnostic and therapeutic skills. The first skill is to locate posterior skeletal structures using manual palpation. Presented with a target structure, the invention will verify whether the target was located accurately. Another use of the system is to help teach students to identify regions of relative spinal fixation, an important diagnostic skill for manipulative therapies. The invention can also be used as a training dummy for manipulative thrusts. Novice students can thrust on the dummy many times and be given feedback regarding the correctness of the spinal structure being contacted.

Figure 1:
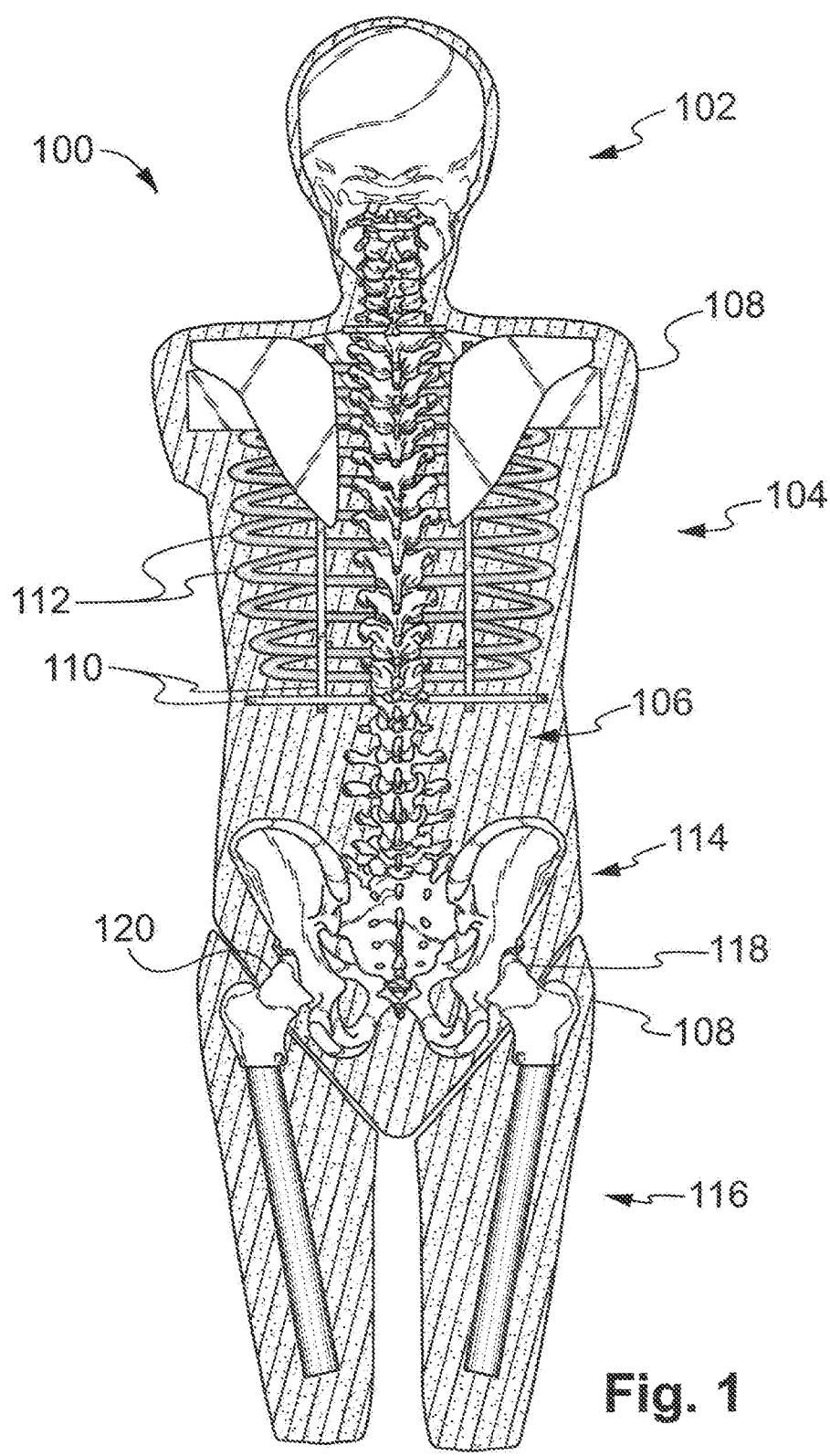
FIG. 1 is a simplified drawing of a life-sized model of a human spinal column constructed in accordance with the invention including multiple vertebral levels.

As shown in FIG. 1, the mannequin 100 comprises a life-sized simulacrum including a human head 102 and torso 104 with fully moveable and anatomically correct spinal vertebrae 106 embedded in pliable silicone skin 108 and gel materials. An internal scaffold 110 supports rib structures 112 which attach to thoracic spinal vertebra and provides connections for the cervical and lumbar spinal regions. An articulated pelvis 114 provides support to simulated upper legs 116 with moveable hip joints 118, 120. A system of tensionable strings and elastic cords provide stability to the vertebral joints and allow control of relative joint stiffness. The compliance of the spine matches measurements found in the spines of living humans.

Figure 4:
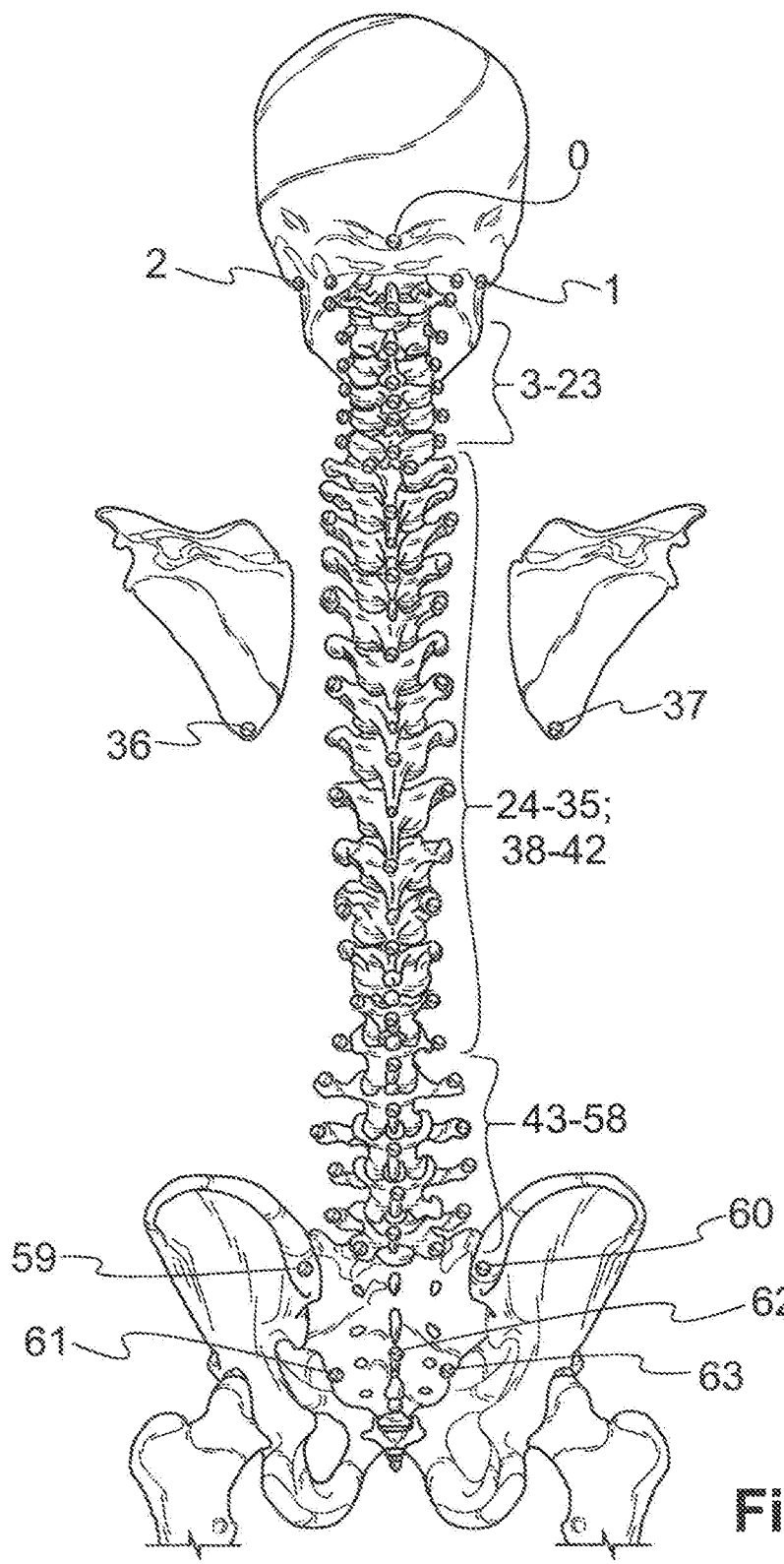
FIG. 4 illustrates a preferred sensor layout.

A network of pressure sensors is affixed to particular skeletal landmarks as shown in FIG. 4. In the preferred embodiment, 64 thin, pliable sensors are located on the skull, vertebrae and pelvis, including locations on the articular pillars and spinous processes of each cervical vertebra, the spinous and transverse processes of every second thoracic vertebra, and the mammillary and spinous processes of each lumbar vertebra. The sensors are scanned with a microprocessor and multiplexer circuit, and the output is displayed on a computer linked to the circuit board via a USB cable. The computer displays the location, on a labeled image of the skeletal structures, of any pressure applied to the pressure sensors with a gradient of color to show amount of pressure.

Figure 2:
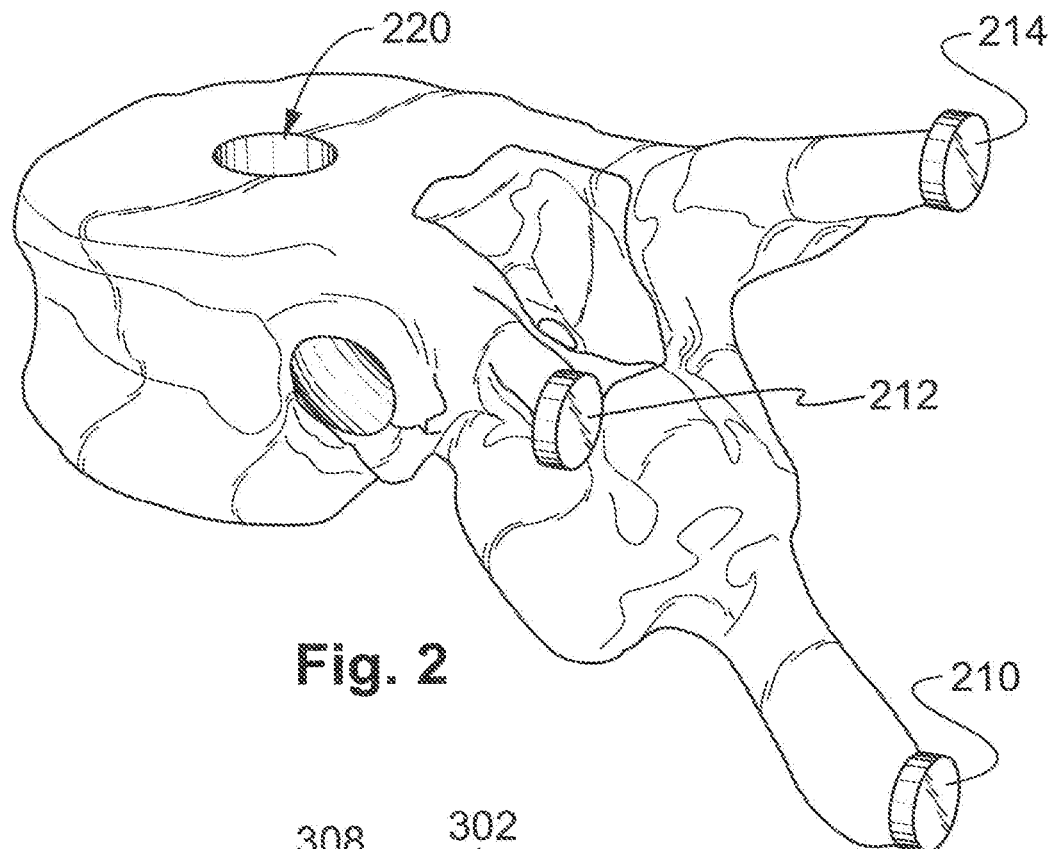
FIG. 2 is a perspective view of a thoracic vertebra model.
Figure 3:
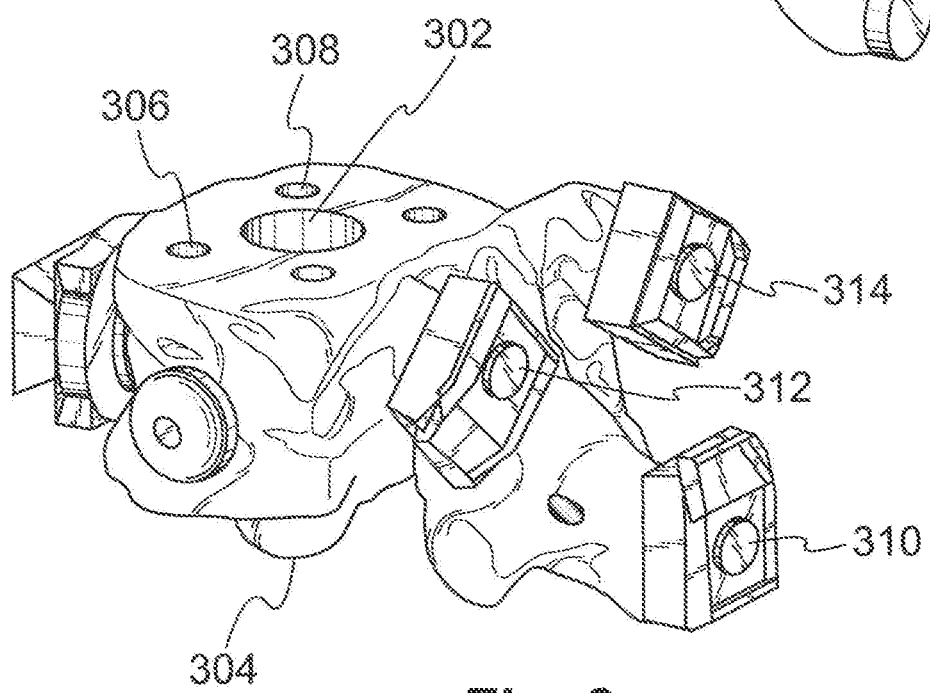
FIG. 3 is a perspective view of a lumbar vertebra model.

Computer-aided design (CAD) models were developed for each vertebra in the spine, plus the skull, sacrum and pelvis. The general shapes of the models are anatomically correct, including posterior facets. FIG. 2 is a perspective view of a thoracic vertebra model, and FIG. 3 is a perspective view of a lumbar vertebra model. Note that the vertebral end plates 302, 304 of the lumbar vertebrae are modified by inserting a shallow ball-and-socket joint between each vertebra. These joints keep the intra-joint spacing intact when the spine is compressed, but do not limit flexion and extension.

Various holes and tunnels (i.e., 306, 308) are also included in the models to allow for the passage of stabilizing cords and/or rib attachments. Further attachment structures are added to the anterior vertebral bodies to allow for stabilizing cords. Sculpted pads are added on the spinous processes (i.e., 210, 310), transverse processes 212, 214 of the thoracic vertebrae, and mammillary processes 312, 314 of the lumbar vertebrae to provide mounting locations for pressure sensors. The vertebral bodies of the cervical and thoracic vertebra have a central tunnel (i.e., 210) running through them to allow for passage of a connecting elastic cord.

The CAD models are made into physical structures using a desktop 3D printer using PLA extrusion material. The thoracic vertebrae are mounted in a wooden box that provides stability to the central core and a mounting location for electronics and tension control strings. A rib cage composed of polyethylene tubing connects each thoracic vertebra to the contoured posterior edge of the wooden box.

An internal structure 110 is made of plywood to provide connection points to the vertebral regions. It is composed of ovoid endplates that firmly hold the first and last thoracic vertebrae (T1 & T12). The sides of the structure span the gap between the plates at T1 & T12 and also support rib structures made of polyethylene tubing. The middle thoracic vertebrae are suspended in the box via connections to the ends of the tubing.

The tubes allow for passage of a set of strings that control the compression of a sliding joint where the tubes connect to each vertebra.

The last cervical vertebra (C7) is attached to T1 using the elastic cord 902 running through the vertebral bodies. The base of the skull (occiput) is modeled in CAD to exactly match the C1 vertebra's upper surface. The central elastic cord running through the cervical vertebral bodies runs through the dens of C2 and is firmly attached to the occiput. Spacing between cervical and thoracic vertebrae is maintained with rubber grommets.

At the lower end of the box, the first lumbar vertebra is firmly attached to T12 and the base of the box using elastic and nylon cord 802. The fifth lumbar (L5) connects to the base of the sacrum using nylon cord. The pelvis, also 3D modeled, is connected with elastic cord (bungee) passing through the sacroiliac joint to the sacrum at the posterior, and with a cord through the symphysis pubis in the anterior. Legs are attached to the pelvis with bungee cords running through the femur heads and into the acetabula.

The cervical and lumbar spinal regions are freely moveable, restricted only by the elastic properties of the strings and cords connecting them, and the adhesion from the silicon layers investing them.

Pressure Sensor Layout

In the preferred embodiment there are 64 thin pressure sensors attached firmly to specific locations on the skeleton as follows (FIG. 4):

On the skull: at the External Occipital Protuberance, and at the left and right posterior-inferior points of the mastoid Processes. (Sensors Nos. 0-2);

On each cervical vertebrae: on each spinous process, and the inferior-posterior surface of the left and right articular pillars. (Sensor Nos. 3-23);

On every second thoracic vertebra: on the spinous process, and the distal posterior surface of each transverse process. (Sensor Nos. 24-35, 38-42);

On each scapula: the posterior inferior tip of the left and right scapula. (Sensor Nos. 36-37);

On each lumbar vertebra: on the spinous process, and the distal posterior surface of each mammillary process. (Sensor Nos. 43-58); and On the pelvis: on the left and right Posterior Superior Iliac Spine, on the Second Sacral Tubercle, on the left and right Posterior Inferior Iliac Spine. (Sensor Nos. 59-63)

It should be understood that the preferred use of 64 sensors placed in accordance with the above distribution, is not the only pattern that may be used, and that fewer or more sensors may be used in accordance with the invention depending upon the application and desired level of operational granularity. Sensors may not be used in particular levels, or more sensors may be used in a particular level. For example, while sensors are placed on every second thoracic vertebra, sensors may be placed on each thoracic vertebra, etc.

Pressure Sensor Scanning Circuit

Figure 5:
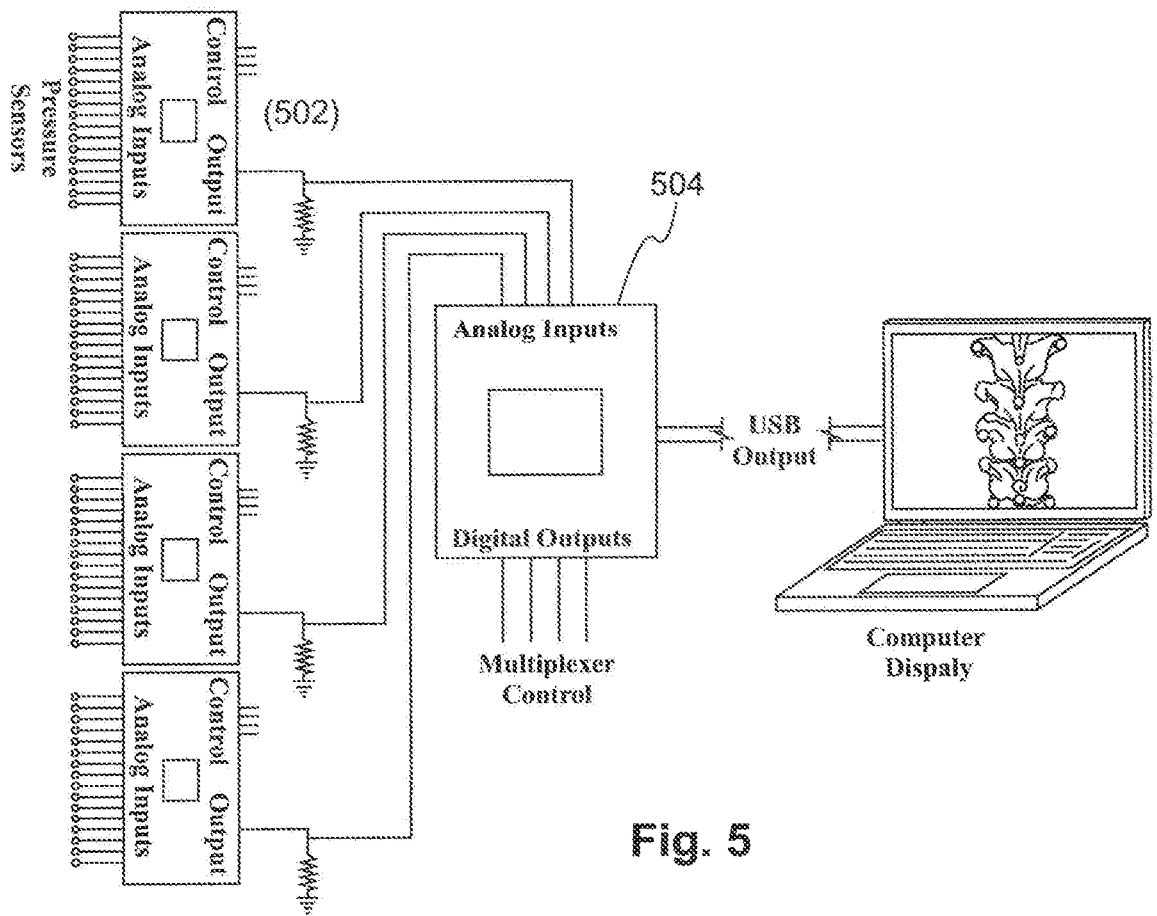
FIG. 5 is a schematic diagram showing sensor scanning electronics.

FIG. 5 is a schematic diagram showing sensor scanning electronics. The pressure sensor array is monitored using multiplexer boards 502 controlled and monitored by an Arduino Uno programmable microprocessor 504. Each of the 64 sensors organized in groups of 16 connect to one of 4 16-channel multiplexers. The digital outputs of the Arduino control which channel of the multiplexers is turned on at each instant. All 4 multiplexers are controlled in synchrony, and each is connected to a different analog input of the Arduino. One side of each pressure sensor is connected to 3.5 volts power via the Arduino. The other side is connected to a channel of a multiplexer board. After being selected, the resistance of the pressure sensor is converted to a voltage by comparison to a fixed resistor in a voltage splitter circuit.

Pressure Sensor Monitoring Software (Arduino)

Figure 6:
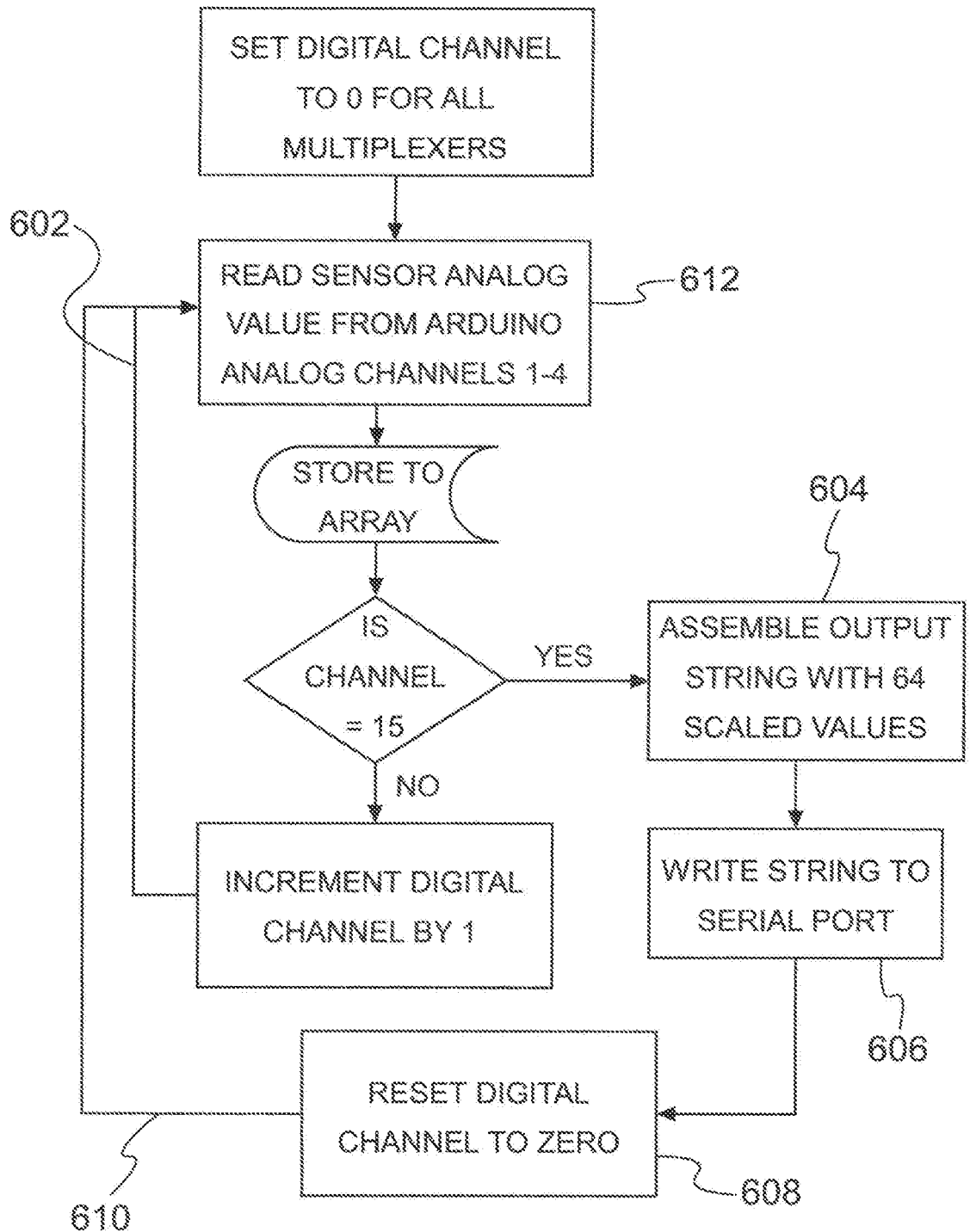
FIG. 6 is a microprocessor program flowchart.

FIG. 6 is a microprocessor program flowchart showing the way in which one aspect of the software controls and monitors the signals. In one loop 602, the 4 channels of digital output count up from 0 to 15, turning on each channel of the 4 multiplexers in sequence. At each setting of the digital counter, the 4 analog input channels are read and the data stored to an array. Scale and offset factors convert the sensor voltage reading to a value between 0 and 255. At the end of each count from 0 to 15, the software assembles a string at block 604 consisting of a code to identify the Arduino and the 64 sensor values in one long comma delimited string. That string is then written to the serial port of the Arduino at 606, the digital channel is reset to zero at 608, and the second loop 610 returns to block 612.

Pressure Sensor Display Software (MS-Windows)

Figures 7A, 7B:
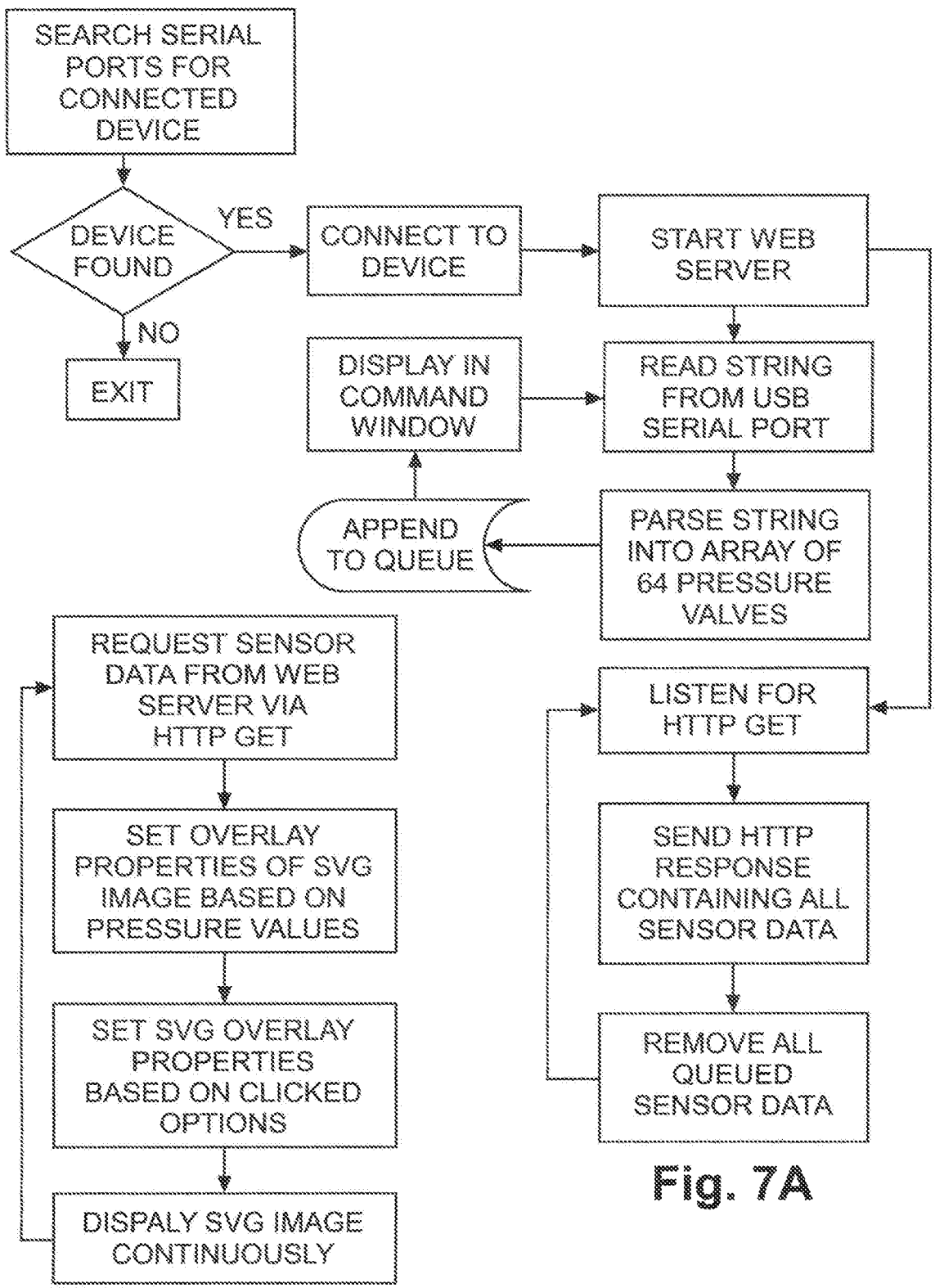
FIG. 7A is a flow diagram that shows how a Python program creates a local web server on the computer and monitors the USB serial port corresponding to the microprocessor.
FIG. 7B is a flow diagram of a browser-based software program consisting of javascript and an SVG file that displays pressure readings graphically.

Custom software is also used to display the sensor array output as color-coded dots on an overlay of the skeleton. Currently the software runs on a Microsoft Windows-based computer. A Python program (FIG. 7A) creates a local web server on the computer and monitors the USB serial port corresponding to the Arduino. The Python program checks the string for the proper length and presence of a specific code. If the string is proper, the program parses the string into individual sensor pressure values and stores them in an array. The array is then printed to the command window the computer and made available to HTTP GET via a queue in local memory.

At the same time, a browser-based program (FIG. 7B), consisting of javascript and an SVG file, displays the pressure readings graphically. The SVG file contains a high-resolution image of the posterior skeleton from the skull to the bottom of the pelvis, and including scapulae. Several layers also exist in the SVG file with overlays representing the location of each sensor with respect to the skeletal image. Javascript running on the browser environment modifies the opacity of certain layers based on the sensor values from the Python program. Light pressure is indicated by a stippled green dot over the sensor location. As pressure increases on a spot, the dot becomes darker green, and then, at higher pressure switches to a red dot, first light red, then more solid.

The software refreshes the screen at a rate of 20 frames per second. Multiple sensors can be showing pressure at the same time if multiple sensors are receiving contact pressure.

The SVG layer also contains short labels for each of the sensor locations, such as C1 TP (Transverse process of the $1^{st}$ Cervical Vertebra). The labels can be turned on or off using a button on the browser window that can be clicked with a mouse. Another button is used to switch sensor overlays from solid circles to gradients.

Joint Stiffness Control System

All of the vertebra are movable with respect to their neighboring skeletal contact. The amount of movement and hence the compliance of the structure is due in large part to the compliance of the elastic bands running through the vertebral bodies in the thoracic and cervical spine, elastic and nylon cords in the lumbar region and the general elasticity of the silicon materials investing the vertebra.

Testing performed with external devices determined that the stiffness of the lumbar spine is in the region of 11-13 Newtons/millimeter of displacement. The thoracic spine is in a similar range. These values are similar to those found in testing living human spines.

It is advantageous to have the option of changing the stiffness properties of the mannequin in order to mimic clinical conditions that therapists might encounter. Such an option increases the educational value of the mannequin. To enable the mannequin to have variable stiffness, each region of the spine contains a method for increasing the compression in the joints to modify the stiffness properties.

Lumbar Spine

Three different techniques may be used for the lumbar spine. In one instance, (FIG. 8B) nylon strings 806 are threaded through apertures in the anterior vertebral bodies, piercing the lamina on the posterior and then connected to small beads on the superior tip of the mammillary processes. Applying tension to one of these strings effectively locks the posterior facet join of the vertebra involved, increasing the stiffness of the spine at that particular level.

Figures 8A, 8B:
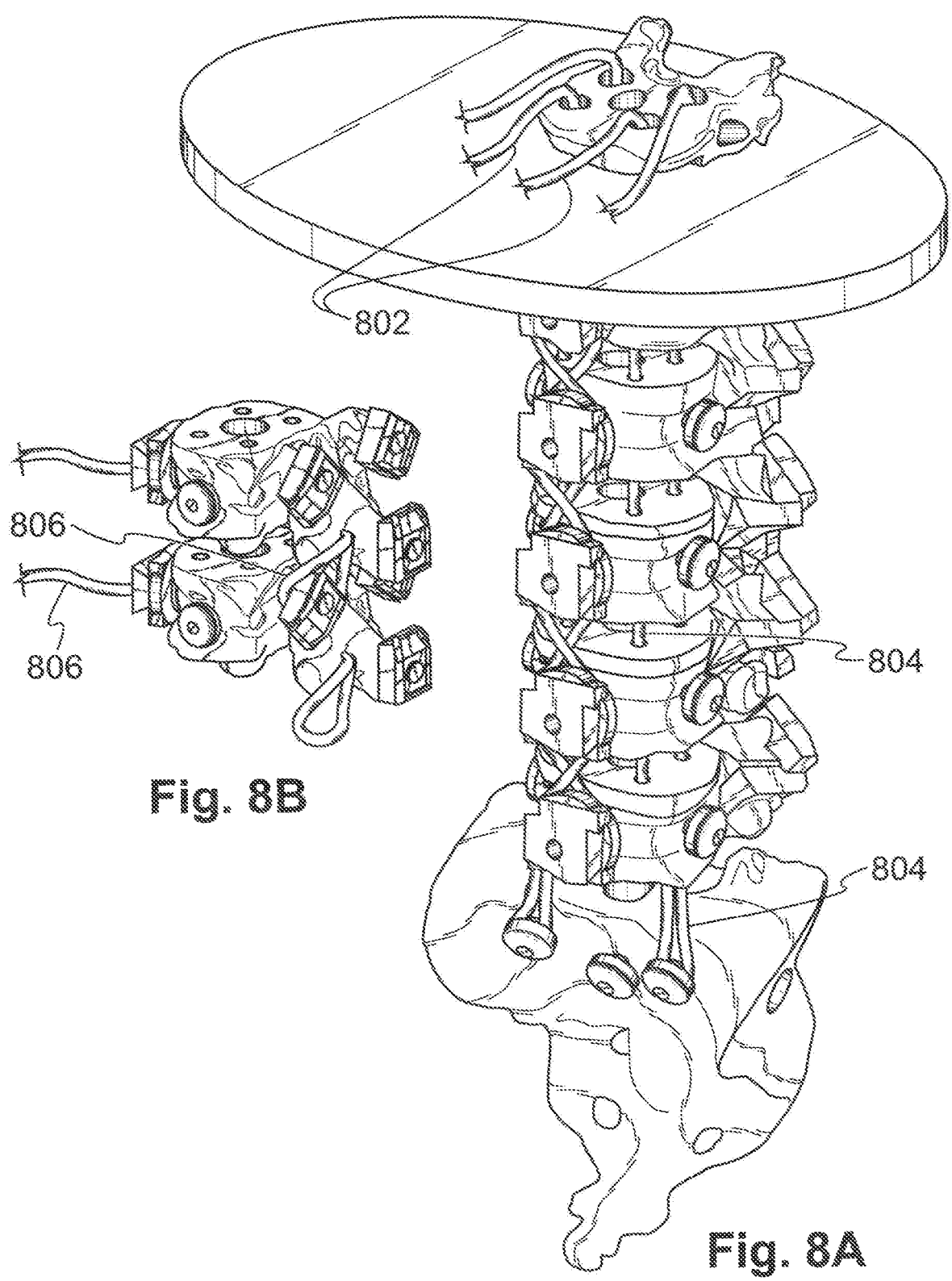
FIG. 8A is an axial view of the lumbar vertebra model of FIG. 3 showing the way in which vertebral bodies articulate and apertures through which tensionable strings or elastic cords are threaded facilitating user control of relative joint stiffness.
FIG. 8B is a view of 2 lumbar vertebrae showing a linkage using control strings to produce compression in the posterior joints.

Alternatively, elastic or nylon cord is threaded through holes in the vertebral endplates, arranged at 4 points antero-lateral and postero-lateral to the center of the vertebral endplate (FIG. 8A). A continuous cord is run from the L1 level to the L3 level. Another cord runs from the L3 level to the sacrum. A total of 8 control cords can be tensioned to produce a variety of compression patterns in the upper 3 lumbar vertebra of the lower 3, causing lateral flexion, flexion, of extension depending on which set of cords are tightened. If all cords are tightened the general stiffness of the spinal region will be increased.

As a further alternative for the lumbar spine, only four cords 804 are used (FIG. 8A). Each spans the full length of the lumbar spine from L1 to the sacrum. Applying tension to the cord induces a small degree of flexion, extension or lateral flexion in the entire lumbar spine. Tightening all cords increases the general stiffness of the region.

Thoracic Spine

Figure 10:
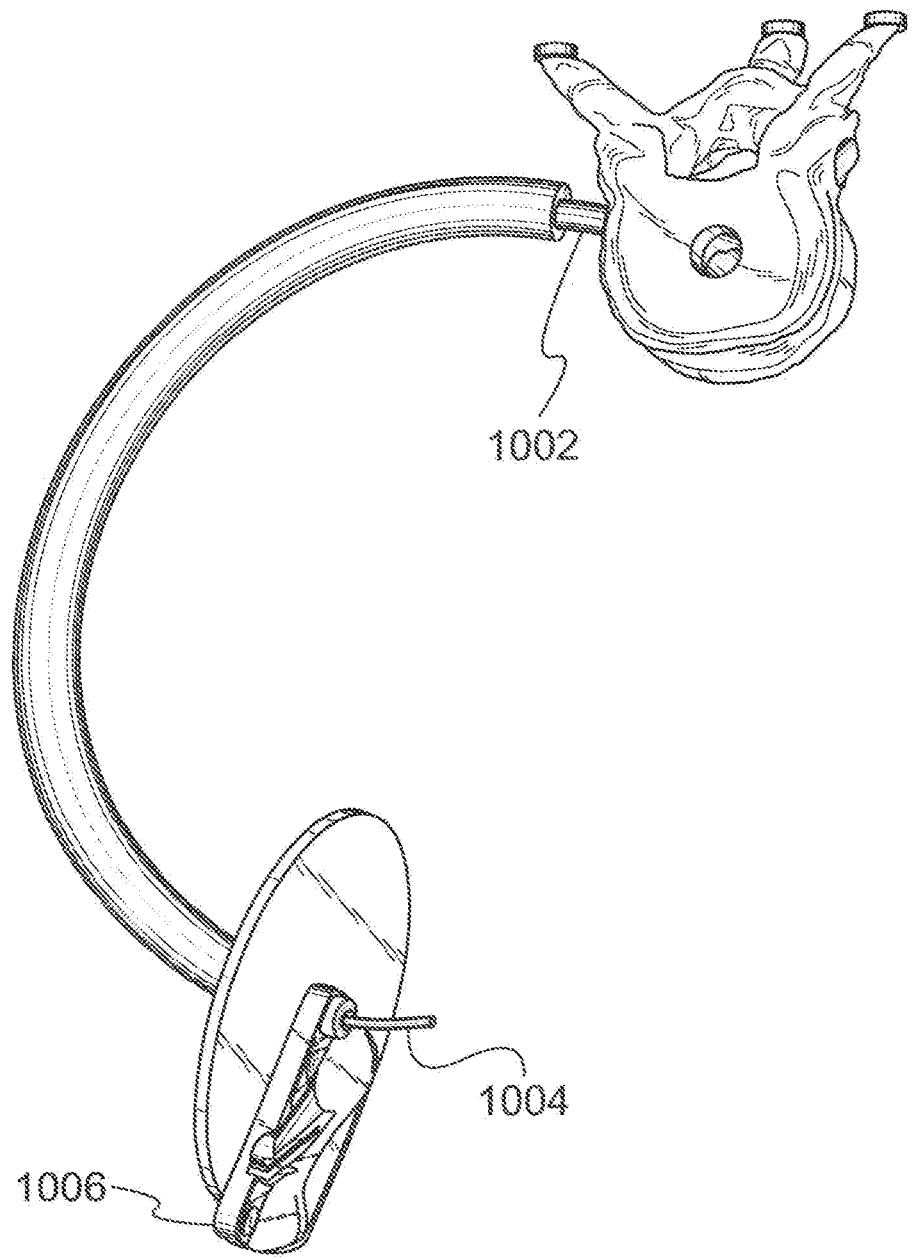
FIG. 10 is a perspective view of a single thoracic vertebra model of FIG. 2 showing the way in which simulated ribs attach to the vertebral body and through which tensionable strings or elastic cords are threaded facilitating user control of relative joint stiffness.

Stiffness modulation is achieved in the thoracic spine by controlling the tension in cords that run through each rib. There is a sliding joint 1002 in the tubes that make up the ribs. (FIG. 10) A cord 1004 runs through that joint and applying tension to that cord decreases the movement available to that joint. The cord can be locked down using a cleat 1006 accessible within the opening in the anterior of the mannequin. All the thoracic vertebra, from T2 through T11, include a separate cord for the left and right side. Applying tension at a small number of adjacent strings increases the stiffness of that section of the thoracic spine in a relatively localized manner. Applying tension to many cords increases the stiffness of the whole region.

Cervical Spine

Figure 9:
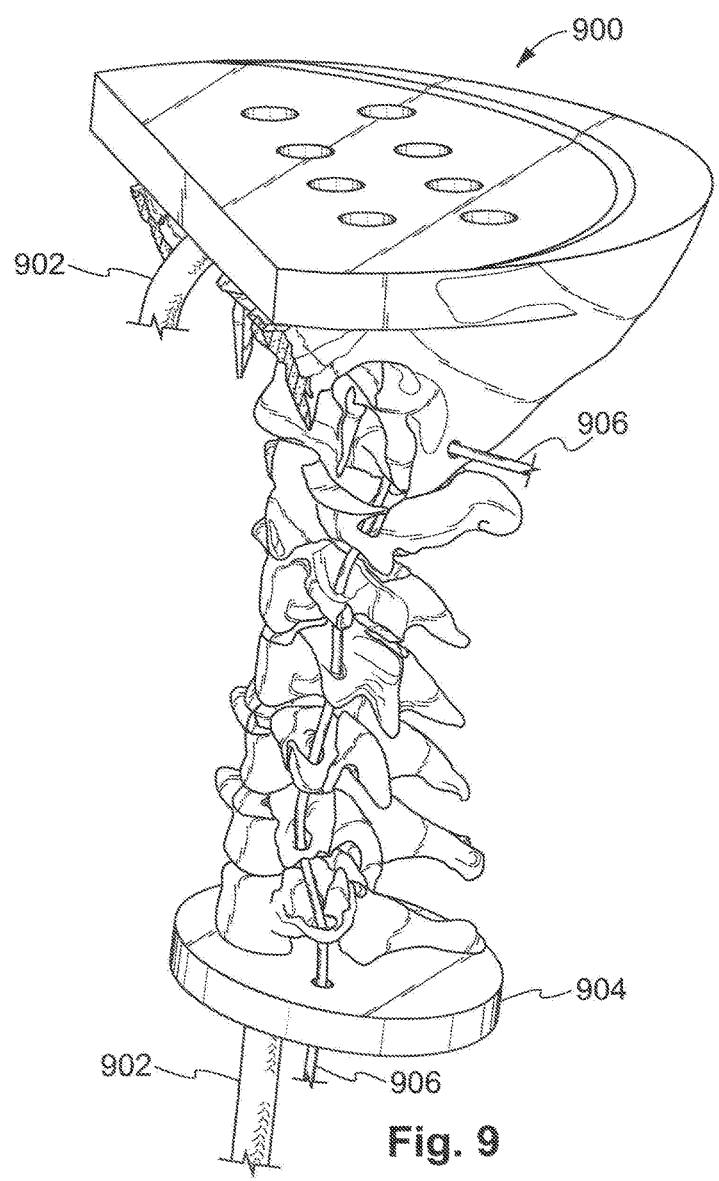
FIG. 9 is an axial view of the cervical vertebra model showing the way in which vertebral bodies articulate and apertures through which tensionable strings or elastic cords are threaded facilitating user control of relative joint stiffness.

The assembled cervical spine shown in FIG. 9 has a heavy elastic cord 902 running from the occiput, through the dens of C2 and the centers of each cervical vertebral body. It is anchored at the top plate 904 of the supporting box 110. In addition the cervical spine has a pair of cords 906 that run through the left and right vertebral canals through which runs the vertebral artery in humans. The cords connect at the mastoid processes and pierce the mounting board at the bottom of the cervical spine 904. Applying tension to one cord will produce lateral flexion to that side. Applying tension to both increases the general stiffness of the cervical spine.

Cord tension in all cases can be applied manually by reaching in the central box opening on the anterior of the mannequin. Each control cord has a slotted clip 1006 that locks the cord in place. In an alternative embodiment of the mannequin, the control strings are attached to rotary motors with electronic controls to allow remote control of the cord tension.

Soft Tissue Materials and Body Contour

The mannequin has a body shape that closely resembles the contours of a human male. Female body contours can also be developed by using a different mold for the trunk. The outer skin of the mannequin is made of a silicon material with a Shore hardness of 20. The skin layer is 3-5 millimeters thick. The interior layers of the mannequin are composed of soft foam in the anterior abdomen and a semi-gelatinous silicone material in the posterior and throughout the neck. The soft materials contribute to the life-like feel of the mannequin upon palpation and allow practitioners to locate internal structures much as they would in a human patient.

The invention claimed is:

1. Chiropractic training apparatus, comprising:
   a physical model including at least a portion of a human spinal column;
   wherein the portion of a human spinal column includes a plurality of sections, each section having a plurality of sequential, adjacent vertebral bodies, each vertebral body having at least one skeletal landmark;
   a plurality of pressure sensors, each being disposed on a respective skeletal landmark for a plurality of sequential, adjacent vertebral bodies associated with at least one of the sections of the spinal column;
   a pliable simulated skin layer of material covering the model and the pressure sensors, enabling a user to palpate the model through the simulated skin layer and locate the skeletal landmarks
   electronic circuitry operative to determine when pressure is applied to any of the plurality of pressure sensors during the palpation of the model; and
   wherein the electronic circuitry outputs an electronic signal to a display device showing a user the location of the pressure applied by the user relative to a graphical representation including the skeletal landmarks.

2. The apparatus of claim 1, wherein:
   the vertebral bodies articulate through vertebral joints exhibiting a relative joint stiffness; and
   furthering including a mechanism facilitating adjustment of the relative joint stiffness.

3. The apparatus of claim 2, wherein the mechanism facilitating adjustment of the relative joint stiffness includes a plurality of tensionable elongated members disposed along side or through the vertebral bodies.

4. The apparatus of claim 2, wherein the mechanism facilitating adjustment of the relative joint stiffness includes a plurality of elongated elastic members disposed along side or through the vertebral bodies.

5. The apparatus of claim 1, wherein:
   one of the sections includes a plurality of lumbar vertebra having mammillary and spinous processes; and
   pressure sensors are disposed on the mammillary and spinous processes.

6. The apparatus of claim 1, wherein:
   one of the sections includes a plurality of cervical vertebra having articular pillars and spinous processes; and
   pressure sensors are disposed on the articular pillars and spinous processes.

7. The apparatus of claim 1, wherein:
   one of the sections includes a plurality of thoracic vertebra having spinous processes and transverse processes; and
   pressure sensors are disposed on the spinous processes and transverse processes.

8. The apparatus of claim 1, further including a simulated pelvis with one or more of the pressure sensors disposed thereon.

9. The apparatus of claim 1, further including a simulated human skull with one or more of the pressure sensors disposed thereon.

10. The apparatus of claim 1, wherein the electronic circuitry is operative to sequentially scan the plurality of pressure sensors to determine when pressure is applied.

11. The apparatus of claim 1, further including:
    a computer operative to receive the electronic signal output by the electronic circuitry;
    a display device in communication with the computer; and
    wherein the display is operative to show an image representative of the physical model and information associated with pressure applied by a user to palpate the model.

12. The apparatus of claim 11, wherein the display is operative to show color gradients associated with the pressure applied by a user.

13. The apparatus of claim 1, wherein the physical model is life-sized.

* * * * *